United States Patent
Gupta et al.

[11] Patent Number: 5,995,926
[45] Date of Patent: Nov. 30, 1999

[54] TECHNIQUE FOR EFFECTIVELY RECOGNIZING SEQUENCE OF DIGITS IN VOICE DIALING

[75] Inventors: Sunil K. Gupta, Edison; Frank K. Soong, Warren, both of N.J.

[73] Assignee: Lucent Technologies Inc., Murray Hill, N.J.

[21] Appl. No.: 08/897,806

[22] Filed: Jul. 21, 1997

[51] Int. Cl.[6] ........................................ G10L 5/00
[52] U.S. Cl. .................. 704/240; 704/257; 704/242; 704/244
[58] Field of Search .................... 704/275, 251, 704/255, 256, 257, 240, 242, 244; 455/563, 564

[56] References Cited

U.S. PATENT DOCUMENTS

| | | | |
|---|---|---|---|
| 4,741,036 | 4/1988 | Bahl et al. | 704/256 |
| 5,510,981 | 4/1996 | Berger et al. | 704/257 X |
| 5,613,037 | 3/1997 | Sukkar | 704/256 |
| 5,675,707 | 10/1997 | Gorin et al. | 704/257 |

OTHER PUBLICATIONS

L. Rabiner, "A Tutorial on Hidden Markov Models and Selected Applications in Speech Recognition," *Proceedings of the IEEE*, vol. 77, Feb. 1989, pp. 257–285.

H. Ney, "The Use of a One–Stage Dynamic Programming Algorithm for Connected Word Recognition," *IEEE Trans. on Acoustic Speech and Signal Processing*, vol. ASSP. 32, No. 2, Apr. 1984, pp. 263–271.

*Primary Examiner*—Curtis A. Kuntz
*Assistant Examiner*—Abul K. Azad

[57] ABSTRACT

In a speech recognition system for performing voice dialing, an inventive connected digit recognizer is employed to recognize a sequence of spoken digits. The inventive recognizer generates the maximum-likelihood digit sequence corresponding to the spoken sequence in accordance with the Viterbi algorithm. However, unlike a prior art connected digit recognizer, the inventive recognizer does not assume that a digit model in a sequence can be followed by any digit model with equal probability. Rather, the inventive recognizer takes into account, for each digit model being decided on, a conditional probability that that digit model would follow a given digit model preceding thereto.

28 Claims, 3 Drawing Sheets

TECHNIQUE FOR EFFECTIVELY RECOGNIZING SEQUENCE OF DIGITS IN VOICE DIALING

FIELD OF THE INVENTION

The invention relates to speech recognition systems and methods, and more particularly to systems and methods for recognizing a sequence of digits in voice dialing.

BACKGROUND OF THE INVENTION

In communication, data processing and similar systems, a user interface using audio facilities is often advantageous especially when it is anticipated that the user would be physically engaged in an activity (e.g., driving a car) while he/she is operating one such system. Techniques for recognizing human speech in such systems to perform certain tasks have been developed.

In particular, techniques for recognizing a sequence of spoken digits to perform voice dialing in such equipment as mobile phones, cellular terminals and computer-telephony integrated (CTI) systems are well-known. One such technique is a connected digit recognition technique involving use of Hidden Markov Models (HMMs). For details on this technique, one may refer to: L. Rabiner, "A Tutorial on Hidden Markov Models and Selected Applications in Speech Recognition," *Proceedings of the IEEE*, Vol. 77, No. 2, February 1989, pp. 257–285.

In accordance with the connected digit recognition technique, individual digits are each characterized by an HMM, and a Viterbi algorithm is used to identify an optimum sequence of HMMs which best matches, in a maximum likelihood sense, the unknown, spoken connected digit sequence. The Viterbi algorithm forms a plurality of sequences of tentative decisions as to what the spoken digits were. These sequences of tentative decisions define the so-called "survival paths." The theory of the Viterbi algorithm predicts that these survival paths merge to the "maximum-likelihood path" going back in time. See G. D. Forney, "The Viterbi Algorithm," *Proceedings of the IEEE*, Vol. 761, No. 3, Mar. 1973, pp. 268–278. In this instance, such a maximum-likelihood path corresponds to a particular digit sequence which maximizes a cumulative conditional probability that it matches the unknown, spoken sequence given the acoustic input thereof. This particular digit sequence is referred to as the "maximum-likelihood digit sequence."

In practice, the sequences of tentative decisions each have a probability score (normally expressed in logarithm) associated therewith, which is updated to reflect the cumulative conditional probability as the tentative decisions are made along the sequence. Based on the respective probability scores of the sequences, the maximum-likelihood digit sequence is identified in accordance with a dynamic programming approach. For details on this approach, one may refer to: H. Ney, "The use of a One-Stage Dynamic Programming Algorithm for Connected Word Recognition," *IEEE Transactions on Acoustics, Speech, and Signal Processing*, Vol. ASSP. 32, No. 2, April 1984, pp. 263–271. In addition, a number of the next best sequences, relative to the maximum-likelihood sequence, may further be identified based on their probability scores, and can be of different lengths (i.e., different numbers of digits in the sequences). All of these sequences including the maximum-likelihood digit sequence are then subject to further processing including validity tests (e.g., one based on duration) to eliminate unreasonable candidates. The most likely and reasonable digit sequence is thus identified and presumed to be the spoken sequence.

The recognition accuracy of a prior art connected digit recognizer, and thus the accuracy of voice dialing, invariably decreases as the digit sequence length increases. In a noisy environment, the recognition accuracy of a long digit sequence, e.g., 7 to 10 digits long, which is typical of a phone number, is undesirably low. The uncertainty to the recognizer of the actual number of digits in the sequence also contributes to the inaccuracy of voice dialing.

Accordingly, there exists a need for a speech recognition system capable of accurately recognizing connected digits to perform voice dialing effectively.

SUMMARY OF THE INVENTION

In a prior art connected digit recognizer, it is assumed that a digit in a sequence to be recognized can be followed by any digit with equal probability. We have recognized that such an assumption is not practical in certain connected speech recognition applications. For example, in voice dialing, a person normally dials from a limited set of phone numbers more often than others. Stemming from this fact, a digit in the sequence would not be followed by any digit with equal probability as assumed in prior art. Rather, a digit tends to be followed by a selected digit in favor of the digit patterns of the limited set of phone numbers.

In accordance with the invention, in recognizing an input connected digit sequence, at least one conditional probability that a selected digit in the sequence would be in a predetermined position relative to one or more given digits in the same sequence is derived. A recognized sequence is then generated as a function of such a conditional probability. Advantageously, the recognition accuracy of the inventive recognizer is improved over the prior art recognizer.

DETAILED DESCRIPTION

Figure 1:
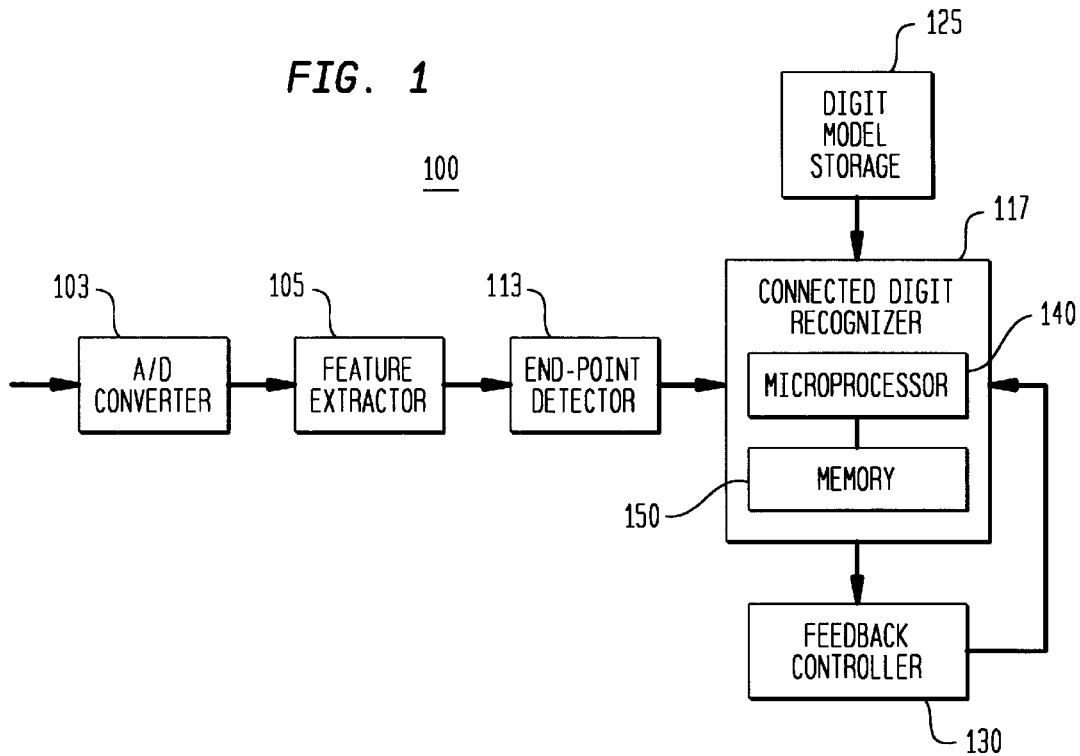
FIG. 1 is a block diagram of a speech recognition system in accordance with the invention.

FIG. 1 illustrates speech recognition system 100 embodying the principles of the invention for recognizing spoken digit sequences. For example, system 100 may be realized as a module for incorporation into such equipment as mobile phones, cellular terminals and computer-telephony integrated (CTI) systems to recognize digit sequences to perform voice dialing.

As shown in FIG. 1, system loo includes a number of functional blocks including analog-to-digital (A/D) convertor 103, feature extractor 105, end-point detector 113, connected digit recognizer 117, digit model storage 125 and feedback controller 130. The functionality of each block of system 100 may be performed by a respective different processor, or the functionality of several or all blocks may be performed by the same processor. Furthermore, each stage can include multiple processing elements. The stages are pipelined and their operations are performed in a synchronous manner.

Specifically, input speech including a sequence of spoken digits is provided, through a microphone (not shown), to A/D convertor 103 in system 100. Convertor 103 in a conventional manner samples the input speech, and generates frames of digital samples representative of the speech. Illustratively, each frame may be 10 to 30 ms long. The successive frames may overlap by up to 10 ms. The digital samples are then provided to feature extractor 105.

Upon receiving the digital samples, feature extractor 105 derives therefrom for each frame a set of short spectrum vectors, e.g., linear-predictive-coding (LPC) parameters. In this instance, the LPC parameters specify a spectrum of an all-pole model which best matches the signal spectrum over a period of time in which the frame of speech samples are accumulated. Extractor 105 thereupon produces, from the LPC parameters, cepstral features which characterize the spectrum of the speech frame. Specifically, these cepstral features represent the discrete cosine transform of the log spectrum of the speech frame. In addition, extractor 105 provides a measure of the energy in the speech frame for end-point detector 103 of conventional design to determine the beginning and end of a speech signal.

Data signals containing information concerning the cepstral features and end point determinations are transmitted by detector 103 to connected digit recognizer 117. The latter includes microprocessor 140 and memory 150. Instructed by a control program which is stored in memory 150, microprocessor 140 performs specified tasks. In particular, based on the aforementioned data signals and digit models provided by digit model storage 125, microprocessor 140 determines what the spoken digit sequence was in accordance with the invention.

Storage 125 contains prototypical models—illustratively Hidden Markov Models (HMMs)—for spoken digits which system 100 is capable of recognizing. In particular, it contains 11 digit models respectively characterizing numerals "1" through "9", plus two models for the numeral "0" corresponding to its pronunciations "zero" and "O".

Based on the Viterbi algorithm, recognizer 117 identifies an optimum sequence of HMMs which best matches, in a maximum likelihood sense, the unknown spoken connected digit sequence. Such a process is realized using a conventional dynamic programming approach. Like a prior art connected digit recognizer, based on the digit models provided by storage 125, recognizer 117 forms a plurality of sequences of tentative decisions as to what the spoken digits were. These sequences of tentative decisions each have a probability score associated therewith, which is updated to reflect the cumulative conditional probability that the decision being made in a sequence would be correct given the acoustic input of the spoken sequence. In addition, the sequences respectively define the so-called "survival paths." The theory of the Viterbi algorithm predicts that the survival paths merge to the "maximum-likelihood path" going back in time. The maximum-likelihood path can be retraced to identify the maximum-likelihood digit sequence in this instance which maximizes the conditional probability that it matches the spoken sequence given the acoustic input thereof.

Traditionally, the aforementioned tentative decisions are made with an assumption that a digit can be followed by any digit in a connected digit sequence with equal probability. However, we have recognized that such an assumption may not be practical in certain connected digit recognition applications. For example, in voice dialing, a user normally voice-dials from a limited set of phone numbers, including his/her home numbers, office numbers, business contact numbers, and friends' and relatives' numbers. Stemming from the fact that the user dials the limited set of phone numbers more often than others, thus in voice dialing, a digit would not be followed by any digit with equal probability as assumed in prior art. Rather, a digit tends to be followed by a selected digit in favor of the digit patterns of the limited set of phone numbers.

Figure 2:
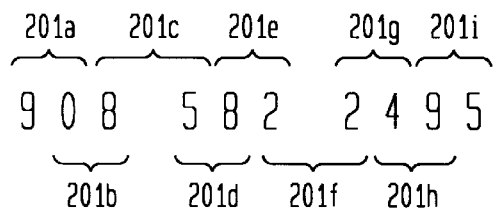
FIG. 2 illustrates a telephone number recognizable by the system of FIG. 1.

As an illustration, let's say that the user frequently uses system 100 to voice-dial the phone number "908-582-2495" in FIG. 2. This phone number comprises digit pairs 201$a$ (i.e., "90"), 201$b$ (i.e., "08"), 201$c$ (i.e., "85"), 201$d$ (i.e., "58"), 201$e$ (i.e., "82"), 201$f$ (i.e., "22"), 201$g$ (i.e., "24"), 201$h$ (i.e., "49"), and 201$i$ (i.e., "95"). Thus, for example, the more often the user dials the number of FIG. 2, the more likely that in a connected digit sequence to be recognized by system 100 the digit "9" is followed by "0" or "5" as reflected by digit pairs 201$a$ and 201$i$; that the digit "0" is followed by "8" as reflected by digit pair 201$b$; that the digit "8" is followed by "5" or "2" as reflected by digit pairs 201$c$ and 201$e$; and so on and so forth.

In accordance with the invention, the information concerning the non-equiprobable pairing of the digits in a sequence is also used by recognizer 117 to form the aforementioned tentative decisions. Thus, unlike a prior art connected digit recognizer, when recognizer 117 makes a tentative decision whether a digit matches a digit model, it further takes into account an additional conditional probability (hereinafter referred to as the "Conditional Digit Pair Probability") that that digit model would follow a given digit model decided by the tentative decision preceding thereto. To that end, the probability score associated with each tentative decision sequence is additionally weighted by the conditional digit pair probability when each tentative decision is formed along the sequence. As a result, the survival paths defined by such tentative decision sequences, and thus the resulting maximum-likelihood path, are favorably influenced by the highly probable digit model pairs. Consequently, the accuracy of connected digit recognition by recognizer 117 is improved over the prior art recognizer.

It should be noted at this point that the prior art recognizer is a special case of recognizer 117 where the aforementioned conditional digit pair probability always equals 1/11, reflecting the above assumption that a given digit model would be followed by any one of the 11 possible digit models with equal probability.

The conditional digit pair probability for each digit model pair is realized in recognizer 117 in a manner to be depicted. As previously described, based on such conditional digit pair probabilities, recognizer 117 generates the maximum-likelihood digit sequence corresponding to the acoustic input to system 100. It then provides such a sequence to feedback controller 130. The latter causes the digits in the received sequence to be uttered in a synthesized voice through a speaker (not shown) for their verification by the user. Alternatively, such digits may be displayed via a liquid crystal display (not shown).

If the uttered sequence does not match the intended sequence, the user may cause controller 130 to send a first feedback signal to recognizer 117 to indicate the incorrect recognition. The user may then repeat the recognition process by again speaking into system 100 the intended digit sequence. Alternatively, the user may bypass system 100 and dial the intended sequence manually. Otherwise if the uttered sequence is correct, the user may cause controller 130 to send a second feedback signal to recognizer 117 to indicate the correct recognition. In response to this second feedback signal, among other things, recognizer 117 causes dialing of the recognized digits to be performed, thereby achieving voice-dialing.

Figure 3:
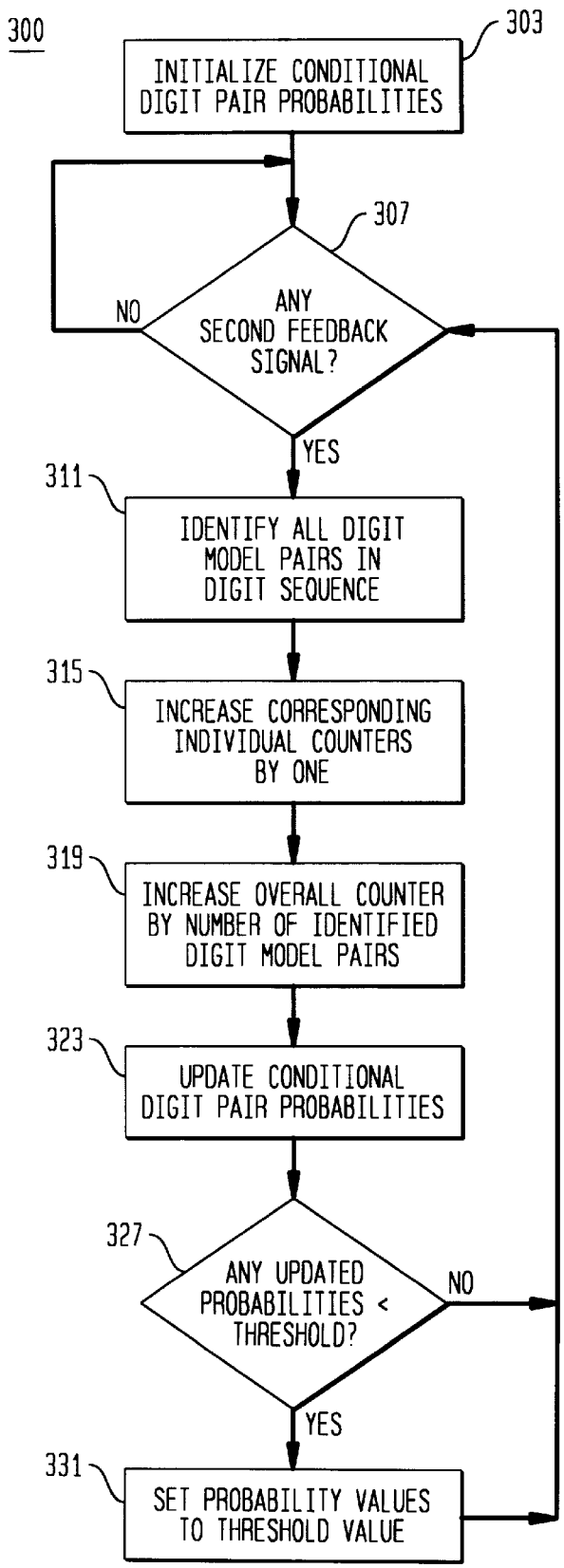
FIG. 3 is a flow chart depicting the steps of a routine run by the system of FIG. 1 for computing conditional digit pair probabilities in accordance with the invention.

The realization of the conditional digit pair probability for each digit model pair in recognizer 117 will now be described. Since there are 11 digit models in this instance, there are 11×11=121 possible digit model pairs. Instructed by adaptive routine 300 in FIG. 3 within the control program stored in memory 150, microprocessor 140 at step 303 initializes the values of the corresponding 121 conditional digit pair probabilities to be 1/11 as in the prior art case. At step 307, microprocessor 140 monitors receipt of any second feedback signal from controller 130, indicating that the digit sequence just generated by recognizer 117 is correct. If microprocessor 140 detects one such feedback signal, it then identifies at step 311 all digit model pairs embedded in the digit sequence in a similar manner to that previously described with reference to FIG. 2. Thus, for example, referring to FIG. 2, if the correct sequence consists of the digit models of "9", "zero" (assuming that the user spoke "zero", rather than "O", for the numeral "0"), "8", "5", "8", "2", "2", "4", "9" and "5" in that order, the digit model pairs identified by microprocessor 140 would correspond to pairs 201a through 201i.

It should be noted at this point that in accordance with routine 300, an individual counter is established for each digit model pair to track the number of occurrences of the pair in correctly recognized sequences. In addition, an overall counter is established to track the total number of digit model pairs identified in those correctly recognized sequences. At step 315, microprocessor 140 increases the value of each of the individual counters, corresponding to the digit model pairs identified above, by one. At step 319, microprocessor 140 increases the value of the overall counter by the number of the identified digit model pairs.

Figure 4:
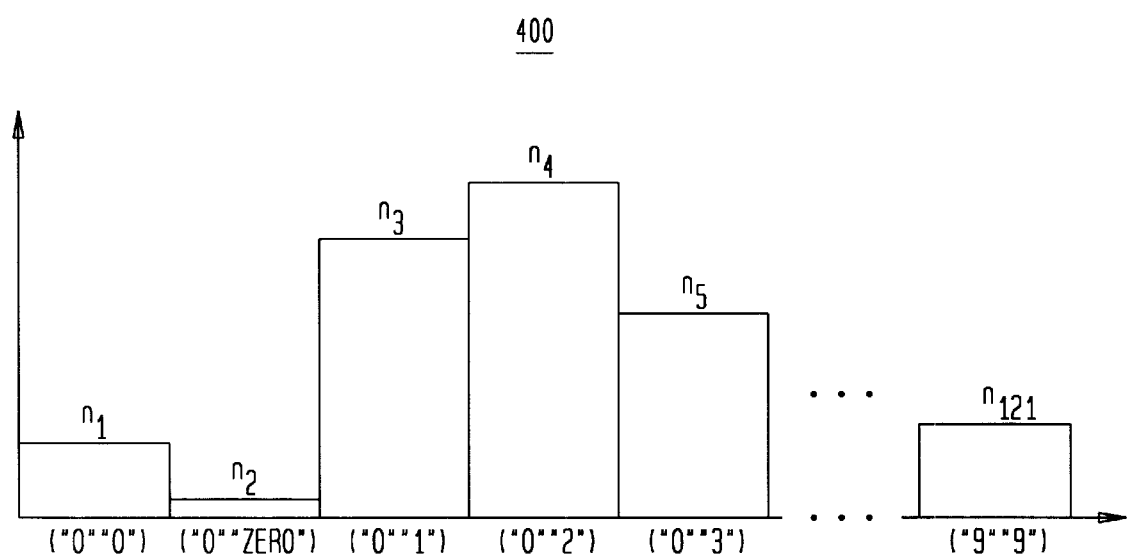
FIG. 4 is a histogram showing statistics on digit model pairs occurring in digit sequences correctly recognized by the system of FIG. 1.

With the above individual counters, statistics on the numbers of occurrences of the 121 digit model pairs in correctly recognized sequences develops in recognizer 117 over time. Such statistics is illustrated by histogram 400 in FIG. 4. In this instance, histogram 400 shows that the numbers of occurrences of the 121 possible digit model pairs including ("O" "O"), ("O" "zero"), ("O" "1"), ("O" "2"), ("O" "3") . . . , and ("9" "9") are $n_1$, $n_2$, $n_3$, $n_4$, $n_5$ . . . and $n_{121}$, respectively, which represent the values of the corresponding individual counters. It should be noted that the value of the above overall counter, say, N, should equal the sum of the values of the individual counters. That is, $$N = \sum_{k=1}^{121} n_k. \quad (1)$$

At step 323, microprocessor 140 updates the conditional digit pair probability for each digit model pair by forming a ratio of the value of the corresponding individual counter to N. For example, the conditional digit pair probability of ("O" "3") in this instance is $n_5/N$. In other words, the conditional probability that a digit model "3" would follow a given digit model "O" in this instance is $n_5/N$.

To prevent the value of a conditional digit pair probability from reaching zero, a predetermined minimum threshold is used here. Illustratively, the value of this threshold is set to be 0.001. Thus, at step 327, microprocessor 140 determines whether the value of each updated conditional digit pair probability is less than the minimum threshold. If each updated probability value is higher than or equal to the threshold, routine 300 returns to step 307 previously described. Otherwise if any updated probability values are below the threshold, routine 300 proceeds to step 331 where microprocessor 140 sets those values to the threshold value, and again returns to step 307.

In an alternative embodiment, the above conditional digit pair probabilities may be derived using a well-known leaky integration technique. In accordance with this technique, each conditional probability ($P_{ij}$) that a digit model "j" would follow a given digit model "i" is first initialized (i.e., set to 1/11 as before), where i and j $\epsilon$ {"O", "zero", "1", "2" . . . "9"}. Each time when an input digit sequence is correctly recognized, for those digit model pairs (i j) which occur in the correctly recognized sequence, the corresponding $P_{ij}$'s are updated according to the following expression:

$$\overline{P}_{ij} = \alpha \cdot P_{ij} + (1 - \alpha) \cdot \frac{\text{Count}(i, j)}{\text{Total}}, \quad (2)$$

where $\overline{P}_{ij}$ represents the updated version of $P_{ij}$; Count (i, j) represents the number of times the pair (i j) occurs in the sequence; Total represents the total number of possible digit model pair combinations (i.e., 121 in this instance); and $0 \approx \alpha \leq 1$, which is an integration constant. In a well-known manner, the value of a is selected to accord proper weight to the adaptation. That is, the closer the selected value of $\alpha$ to 1, the less $P_{ij}$ is susceptible to adaptation or change during the update. In this instance, $\alpha = 0.95$.

The application of the above leaky integration technique may optionally be followed by that of a well-known leaky subtraction technique applicable to the other digit model pairs (i j) which do not occur in the correctly recognized sequence. In accordance with the leaky subtraction technique, the corresponding $P_{ij}$'s are updated according to the following expression:

$$\overline{P}_{ij} = P_{ij} - (1 - \beta) \cdot \left[\frac{1}{\text{Total}}\right], \quad (3)$$

where $\overline{P}_{ij}$ again represents the updated version of $P_{ij}$; Total is defined as above; and $0 \leq \beta \leq 1$, which is a subtraction constant. Similar to the value of $\alpha$, the closer the selected value of $\beta$ to 1, the less $P_{ij}$ is susceptible to adaptation. In this instance, $\beta = 0.99$.

To limit the range of the values of the above $P_{ij}$'s, they may be normalized according to the following expression:

$$\hat{P}_{ij} = \frac{P_{ij}}{\sum_{all\ j} P_{ij}}, \quad (4)$$

where $\hat{P}_{ij}$ represents the normalized value of $P_{ij}$. The normalized values, $\hat{P}_{ij}$'s, are used for the above respective conditional digit pair probabilities.

The foregoing merely illustrates the principles of the invention. It will thus be appreciated that a person skilled in the art will be able to devise numerous systems which, although not explicitly shown or described herein, embody the principles of the invention and are thus within its spirit and scope.

For example, in the disclosed embodiment, every digit model pair in a correctly recognized digit sequence is used by recognizer 117 to update the conditional digit pair probabilities. However, it will be appreciated that a person skilled in the art will use only selected digit model pairs for that purpose, instead. For instance, it may be desirable to use only the first two digit model pairs in a sequence for the update, which correspond to the first three digits of the sequence. According to the North American numbering plan, the first three digits normally correspond to either an area code in a long distance phone number or an exchange code in a local number. Thus, if it is suspected that one usually calls people within few locales (i.e., within the same area codes or exchange codes), special attention to the first two digit model pairs is warranted in that instance. For that matter, it may be more desirable to process the above sequences in terms of digit model trios or trigrams, rather than digit model pairs as in the illustrative embodiment. In that case, the corresponding conditional probability that a digit model would follow a particular digit model pair should be developed. Alternatively, the conditional probability that the digit model would precede the particular digit model pair, or that the digit model would be sandwiched therebetween may be developed, instead. Accordingly, the memory space in the recognizer needs to be increased by an order of magnitude to account for 11×11×11=1,331 trigrams.

In addition, in the disclosed embodiment, 121 counters are used in adaptive routine 300 to tally the numbers of occurrences of the respective digit model pairs in correctly recognized digit sequences. It will be appreciated that to save memory space, even though "O" and "zero" are recognized based on different digit models, they will be treated identically in compiling the statistics. In that case, for example, the same counter will be used to account for an occurrence of the digit model pair ("1" "zero") or ("1" "O"), despite the fact that the same value will be used for the conditional digit pair probabilities of ("1" "zero") and ("1" "O"). That value will actually equal the sum of the values of the respective conditional digit pair probabilities where ("1" "zero") and ("1" "O") are assigned two different counters as in the disclosed embodiment. Thus, by treating "O" and "zero" identically in computing the conditional digit pair probabilities, one will save at least on the required counters, whose number will be 10×10=100, as opposed to 121 in the disclosed embodiment.

Moreover, in the disclosed embodiment, recognizer 117 outputs the maximum-likelihood digit sequence as the recognized sequence. It will be appreciated that in producing such a recognized sequence, a person skilled in the art will consider in addition to the maximum likelihood sequence, a number of the next best sequences with respect thereto based on their probability scores. These sequences including the maximum likelihood sequence which may be of different lengths will be subject to further processing including validity tests to eliminate unreasonable candidates. The most likely and reasonable digit sequence will then be produced as the recognized sequence.

Finally, adaptive routine 300 in the illustrative embodiment does not need to be invoked each time when a sequence is correctly recognized. Instead, it can be invoked every once in so many correct recognitions.

We claim:

1. A system for recognizing speech including a selected sequence of a plurality of digits, comprising:
    a recognizer for generating a recognized sequence corresponding to the selected sequence based on at least one conditional probability that a selected digit in the selected sequence would be in a predetermined position relative to one or more given digits in said selected sequence;
    a controller for generating a feedback signal when the recognized sequence matches the selected sequence; and
    a processor responsive to the feedback signal for modifying the at least one conditional probability.

2. The system of claim 1 wherein said controller includes a synthesizer for uttering the recognized sequence.

3. The system of claim 2 wherein said feedback signal is generated as a result of a comparison of the uttered sequence and the selected sequence.

4. The system of claim 1 wherein said controller is capable of generating another feedback signal indicating that the recognized sequence does not match the selected sequence.

5. The system of claim 1 wherein the selected sequence includes a telephone number.

6. The system of claim 5 further comprising means for dialing said telephone number.

7. The system of claim 1 wherein the recognized sequence is generated in accordance with a Viterbi algorithm.

8. The system of claim 7 wherein the recognized sequence includes a maximum-likelihood digit sequence.

9. The system of claim 1 wherein said selected digit is preceded by said one or more given digits in said selected sequence.

10. A speech recognition system for operating a device based on correctly recognized speech, the system comprising:
    an interface for receiving a speech input including a selected sequence of a plurality of digits;
    a processor for updating at least one conditional probability that a selected digit in the selected sequence would be in a predetermined position relative to one or more given digits in said selected sequence;
    a recognizer for generating a recognized sequence corresponding to said selected sequence as a function of said at least one conditional probability; and
    a controller for providing a feedback signal when the recognized sequence matches the selected sequence, the processor in response to the feedback signal operating the device and updating the at least one conditional probability based on the recognized sequence.

11. The system of claim 10 wherein said selected sequence includes a telephone number.

12. The system of claim 10 wherein the recognized sequence is generated in accordance with a Viterbi algorithm.

13. The system of claim 10 wherein said recognizer includes said processor.

14. The system of claim 10 wherein said selected digit is preceded by said one or more given digits in said selected sequence.

15. A method for recognizing speech including a selected sequence of a plurality of digits, comprising:
    generating a recognized sequence corresponding to the selected sequence based on at least one conditional probability that a selected digit in the selected sequence would be in a predetermined position relative to one or more given digits in said selected sequence;
    generating a feedback signal when the recognized sequence matches the selected sequence; and
    modifying the at least one conditional probability in response to the feedback signal.

16. The method of claim 15 further comprising uttering the recognized sequence in synthesized voice.

17. The method of claim 16 wherein said feedback signal is generated as a result of a comparison of the uttered sequence and the selected sequence.

18. The method of claim 15 further comprising generating another feedback signal indicating that the recognized sequence does not match the selected sequence.

19. The method of claim 15 wherein the selected sequence includes a telephone number.

20. The method of claim 19 further comprising dialing said telephone number.

21. The method of claim 15 wherein the recognized sequence is generated in accordance with a Viterbi algorithm.

22. The method of claim 21 wherein the recognized sequence includes a maximum-likelihood digit sequence.

23. The method of claim 15 wherein said selected digit is preceded by said one or more given digits in said selected sequence.

24. A method for use in a speech recognition system to operate a device based on correctly recognized speech, the method comprising:

receiving a speech input including a selected sequence of a plurality of digits;

updating at least one conditional probability that a selected digit in the selected sequence would be in a predetermined position relative to one or more given digits in said selected sequence;

generating a recognized sequence corresponding to said selected sequence as a function of said at least one conditional probability;

providing a feedback signal when the recognized sequence matches the selected sequence; and in response to the feedback signal, operating the device and updating the at least one conditional probability based on the recognized sequence.

25. The method of claim 24 wherein said selected sequence includes a telephone number.

26. The method of claim 24 wherein the recognized sequence is generated in accordance with a Viterbi algorithm.

27. The method of claim 26 wherein the recognized sequence includes a maximum-likelihood digit sequence.

28. The method of claim 24 wherein said selected digit is preceded by said one or more given digits in said selected sequence.

* * * * *